(12) United States Patent
Moore

(10) Patent No.: US 6,305,645 B1
(45) Date of Patent: Oct. 23, 2001

(54) AIRCRAFT CREW REST STATION FOR A LONG DISTANCE AIRLINE FLIGHT

(75) Inventor: Brian W. Moore, Mukilteo, WA (US)

(73) Assignee: BE Intellectual Property, Inc., Wellington, FL (US)

( * ) Notice: Subject to any disclaimer, the term of this patent is extended or adjusted under 35 U.S.C. 154(b) by 0 days.

(21) Appl. No.: 09/649,505

(22) Filed: Aug. 28, 2000

Related U.S. Application Data

(63) Continuation of application No. 09/216,446, filed on Dec. 18, 1998, now Pat. No. 6,182,926.

(51) Int. Cl.7 .................................................. B64D 11/06
(52) U.S. Cl. ........................................ 244/118.5; 244/119
(58) Field of Search .................................. 244/118.5, 119, 244/117 R, 118.1, 118.6; 105/314–316, 321–322, 326, 327, 346

(56) References Cited

U.S. PATENT DOCUMENTS

| | | | |
|---|---|---|---|
| 2,589,894 | * | 3/1952 | Ten Eyck ........................... 244/118.5 |
| 3,898,704 | | 8/1975 | Gallaher et al. . |
| 4,066,227 | * | 1/1978 | Buchsel ............................. 244/118.5 |
| 4,071,210 | | 1/1978 | Mutke . |
| 4,458,864 | | 7/1984 | Colombo et al. . |
| 4,589,612 | * | 5/1986 | Halim ................................. 244/118.6 |
| 4,594,817 | | 6/1986 | McLaren et al. . |
| 4,645,145 | | 2/1987 | Alie . |
| 4,653,707 | * | 3/1987 | Hamilton et al. .................. 244/118.5 |
| 4,732,103 | | 3/1988 | Culbertson . |
| 4,745,643 | | 5/1988 | Clarke . |
| 5,024,398 | | 6/1991 | Riedinger et al. . |
| 5,026,006 | | 6/1991 | Tinder et al. . |
| 5,031,860 | | 7/1991 | Ruiz et al. . |
| 5,111,626 | | 5/1992 | Fortune . |
| 5,115,999 | * | 5/1992 | Buchsel et al. ................... 244/118.5 |
| 5,150,863 | | 9/1992 | Hozumi . |
| 5,314,143 | | 5/1994 | Luria . |
| 5,395,075 | | 3/1995 | Sprenger et al. . |
| 5,425,516 | | 6/1995 | Daines . |
| 5,474,260 | | 12/1995 | Schwertfeger et al. . |
| 5,487,240 | | 1/1996 | Miller . |
| 5,638,646 | | 6/1997 | Shane . |
| 5,740,989 | | 4/1998 | Daines . |
| 5,784,836 | | 7/1998 | Ehrick . |
| 5,992,797 | * | 11/1999 | Seidel et al. ...................... 244/118.5 |
| 6,003,813 | * | 12/1999 | Wentland et al. ................. 244/118.5 |

OTHER PUBLICATIONS

Boeing 747 Crew Rest Compartment and Proposals for Same; Correspondence from Flight Structures, Inc. To Air France Dated Aug. 3, 1994 (10 Pages), Nov. 15, 1994 (4 Pages) and Jul. 23, 1996 (11 Pages).

* cited by examiner

Primary Examiner—Galen L. Barefoot
(74) Attorney, Agent, or Firm—Fulwider Patton Lee & Utecht, LLP

(57) ABSTRACT

The aircraft crew rest station for a long distance airline flight includes an overhead crew rest portion contoured to occupy the space between the curved top portion of the hull of the aircraft and the lowered ceiling of the aircraft, and an entry vestibule providing access to the overhead crew rest portion. The overhead crew rest portion includes contains one or more forward, aft, and side bunk portions. The crew rest station can be located approximately in the aircraft midsection. In one presently preferred embodiment, the overhead crew rest portion comprises forward, aft, and side bunk portions configured in cross-wise fashion. The vestibule also provides a lavatory area, as well as a closet space.

12 Claims, 14 Drawing Sheets

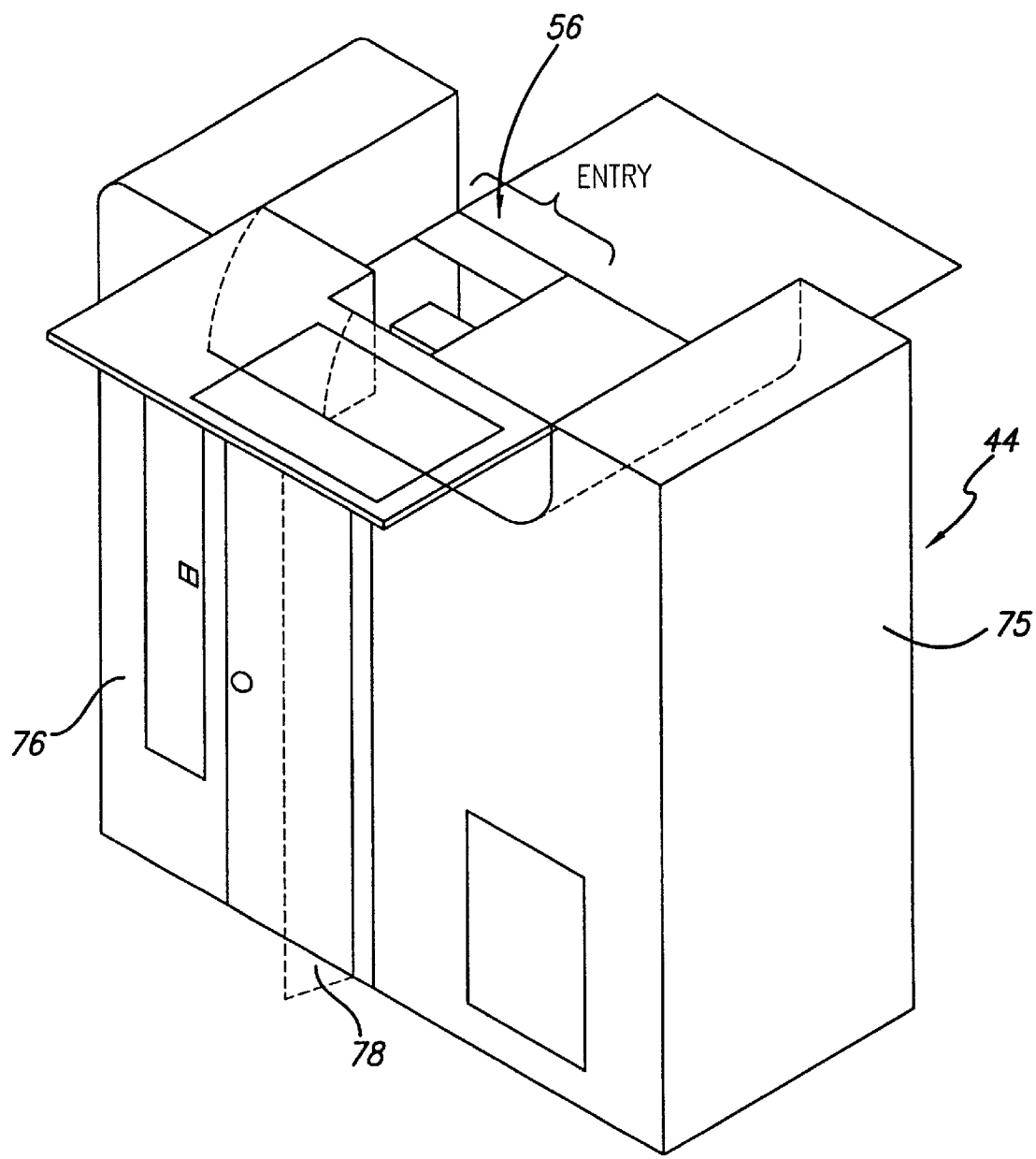
FIG. 10
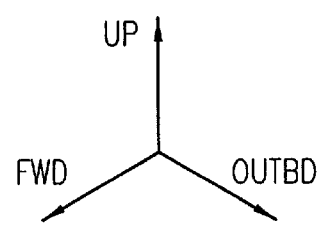

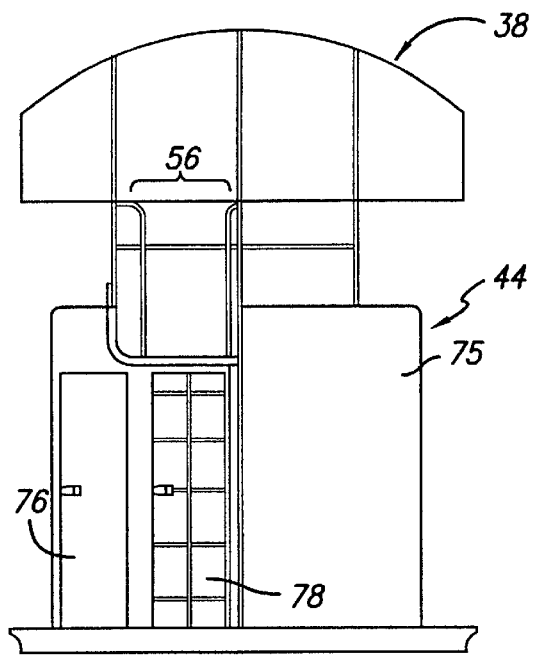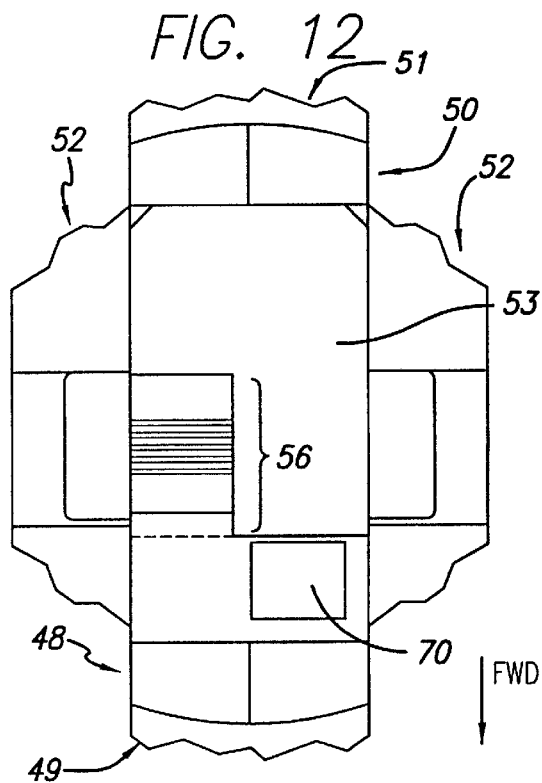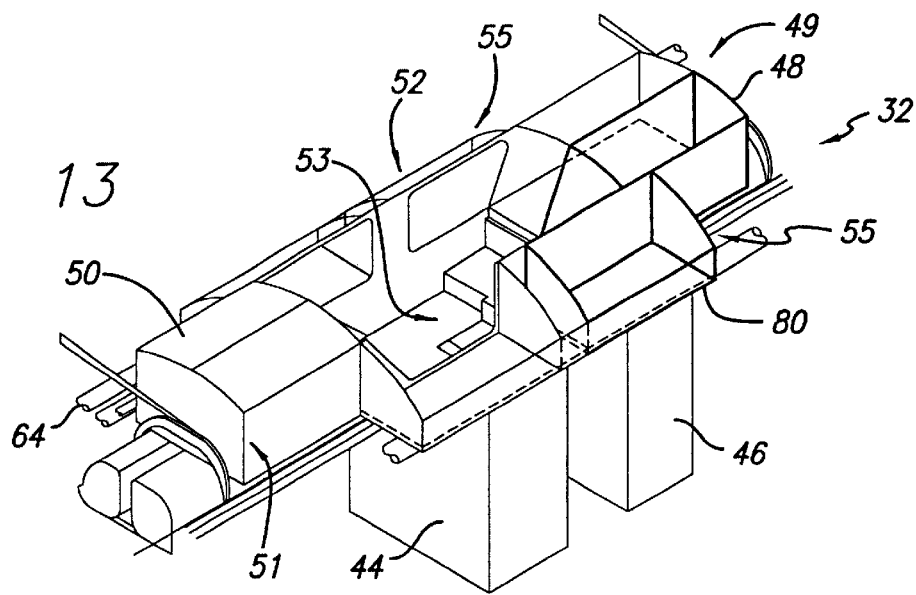

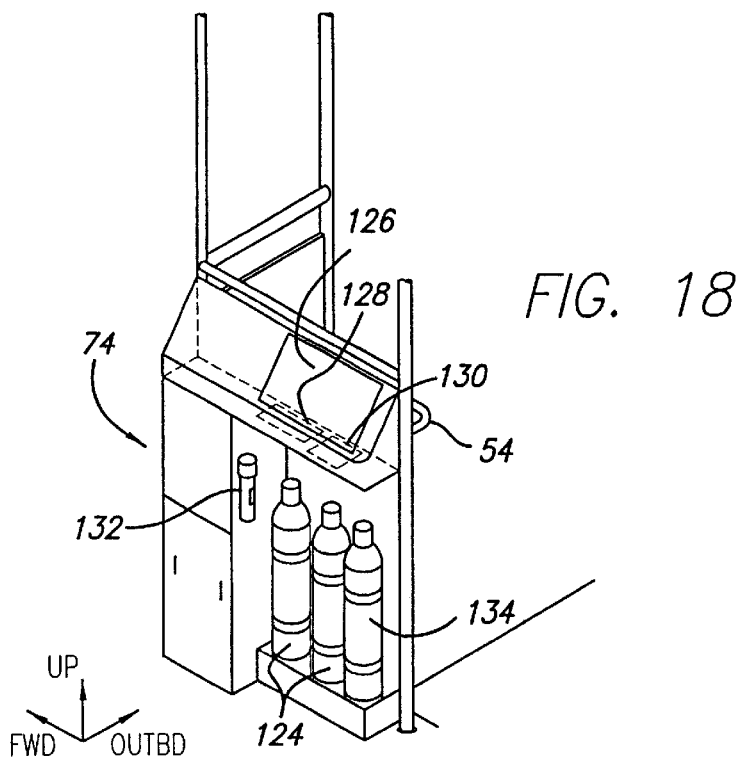
FIG. 18
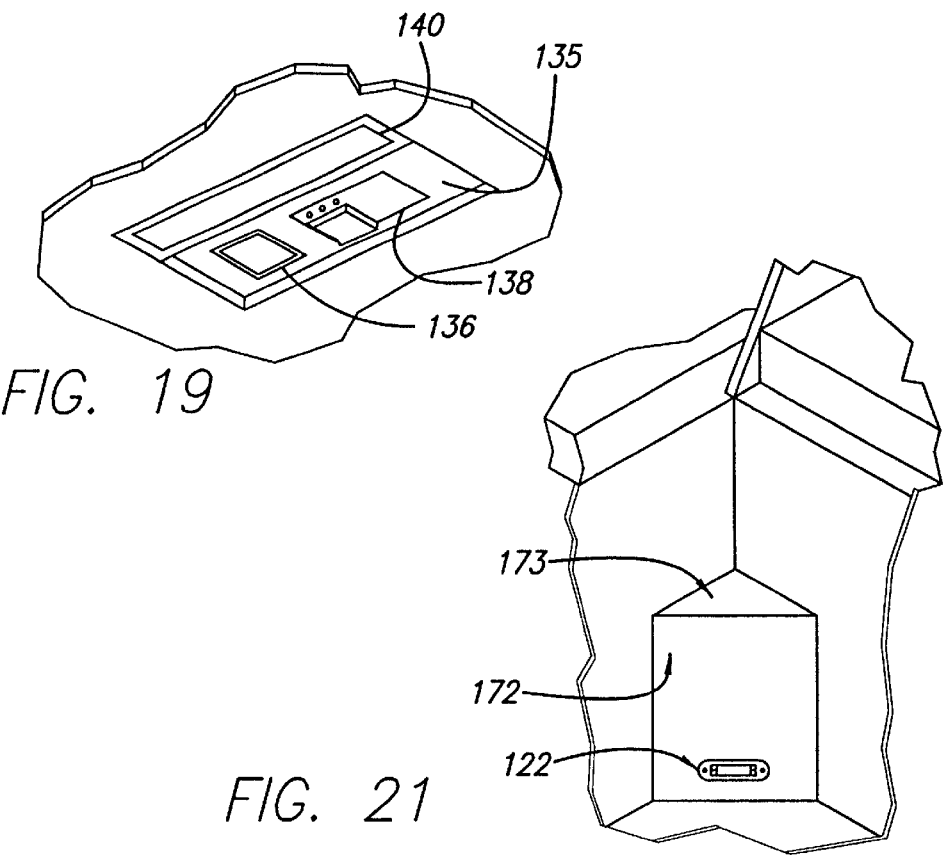
FIG. 19
FIG. 21

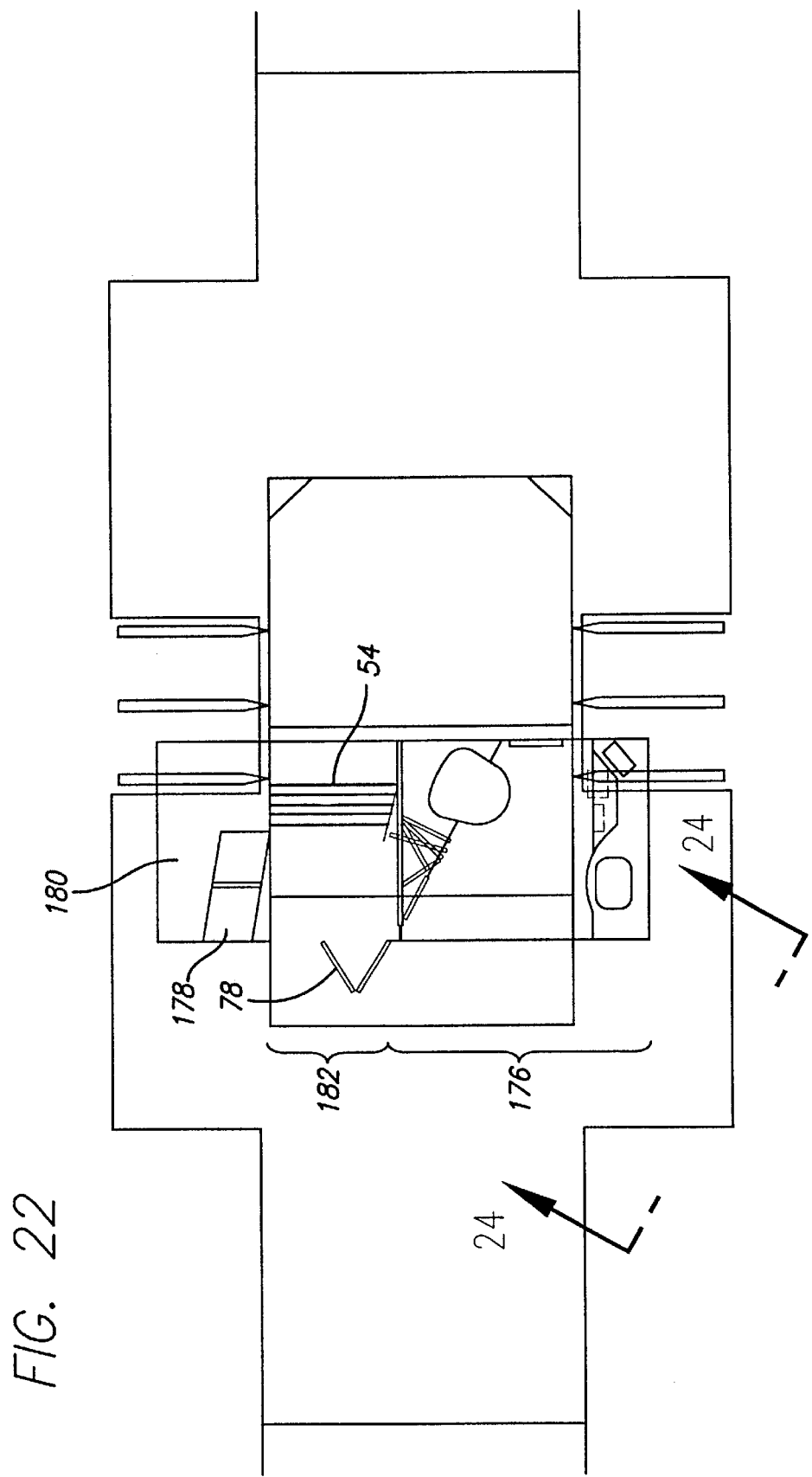

US 6,305,645 B1

AIRCRAFT CREW REST STATION FOR A LONG DISTANCE AIRLINE FLIGHT

RELATED APPLICATIONS

This is a continuation of Ser. No. 09/216,446 filed Dec. 18, 1998 now U.S. Pat. No. 6,182,926.

BACKGROUND OF THE INVENTION

1. Field of the Invention

This invention relates generally to resting and sleeping quarters for an aircraft crew, and more particularly concerns overhead aircraft crew resting and sleeping quarters with amenities and emergency equipment, in a space-saving and weight-saving configuration occupying substantially otherwise unused space aboard an aircraft.

2. Description of Related Art

Resting or sleeping facilities are commonly provided for the crew and/or passengers of ships, boats, trucks, buses, and the like when they are used for transportation of cargo or passengers over long distances. However, such facilities have been more uncommon for long distance airline flights, due to aircraft weight constraints and limitations of available space aboard aircraft. Bunks for crew members aboard ship, for example, are typically constructed of heavy metal frames bolted together to provide a heavy structure inappropriate for aircraft.

One approach to an aircraft crew rest facility is currently available that provides configurations having 6 or 7 bunks. However, the crew rest facility is located in the lower lobe cargo bay of the aircraft, and occupies otherwise valuable cargo space, resulting in a loss of full freight capability for the aircraft. The weight of the crew rest facility is approximately 2,200 pounds, which further limits the capacity of the aircraft for carrying cargo or passengers.

It would therefore be desirable to provide an improved configuration for a crew rest and sleeping station with increased capacity for crew members, includes all necessary amenities and emergency equipment to meet the requirements of flight regulations, and principally occupies an area of the aircraft that is otherwise generally unused. It would also be desirable to provide a crew rest and sleeping station that has a space-saving and weight-saving configuration that minimizes the reduction in capacity of the aircraft for carrying cargo or passengers. The present invention meets these needs.

SUMMARY OF THE INVENTION

Briefly, and in general terms, the present invention provides for an improved crew rest station having less weight (typically approximately 1,250 pounds), no loss of cargo space, and more bunk space.

The present invention according provides for an aircraft crew rest station for a long distance airline flight, the aircraft having a hull with a curved top portion, a lowered ceiling, and a space therebetween, comprising an overhead crew rest portion contoured to occupy the space between the curved top portion of the hull of the aircraft and the lowered ceiling of the aircraft, and an entry vestibule providing access to the overhead crew rest portion. The overhead crew rest portion includes at least one bunk portion, and in a preferred embodiment, contains one or more bunk selected from forward, aft, and side bunk portions. The crew rest station can be located approximately in the aircraft midsection. In one presently preferred embodiment, the overhead crew rest portion comprises forward, aft, and side bunk portions configured in cross-wise fashion. In a presently preferred aspect, the vestibule also provides a lavatory area, as well as a closet space.

These and other aspects and advantages of the invention will become apparent from the following detailed description and the accompanying drawings, which illustrate by way of example the features of the invention.

BRIEF DESCRIPTION OF THE DRAWINGS

FIG. 10 is a perspective view of the lavatory/vanity area showing the crew rest entry way;

FIG. 11 is a sectional elevational view of the lavatory/vanity area showing the crew rest entry way taken along line 11—11 of FIG. 4;

FIG. 12 is a top plan schematic view showing the layout of the crew rest station;

FIG. 13 is a perspective schematic diagram illustrating the general layout of a right side forward bunk;

FIG. 18 is a sectional view of the cabinet for emergency equipment, waste receptacles, and the like taken along line 18—18 of FIG. 17;

FIG. 19 is a sectional view of an overhead light, smoke detector, and emergency panel taken along line 19—19 of FIG. 17;

FIG. 21 is a sectional view of a comer bunk access step and aisle light taken along line 21—21 of FIG. 17;

FIG. 22 is a sectional schematic view of the forward crew lavatory/coat closet and crew rest entry taken along line 22—22 of FIG. 7;

DETAILED DESCRIPTION OF THE PREFERRED EMBODIMENTS

Due to weight and space constraints for aircraft, crew resting or sleeping quarters in aircraft used for transportation of cargo or passengers over long distances need to provide all the necessary amenities and emergency equipment to meet the requirements of flight regulations with a minimum occupation of otherwise useful space, and with a minimum of weight, in order to minimize any reduction in capacity of the aircraft for carrying cargo or passengers by providing such a crew rest station.

Figure 6:
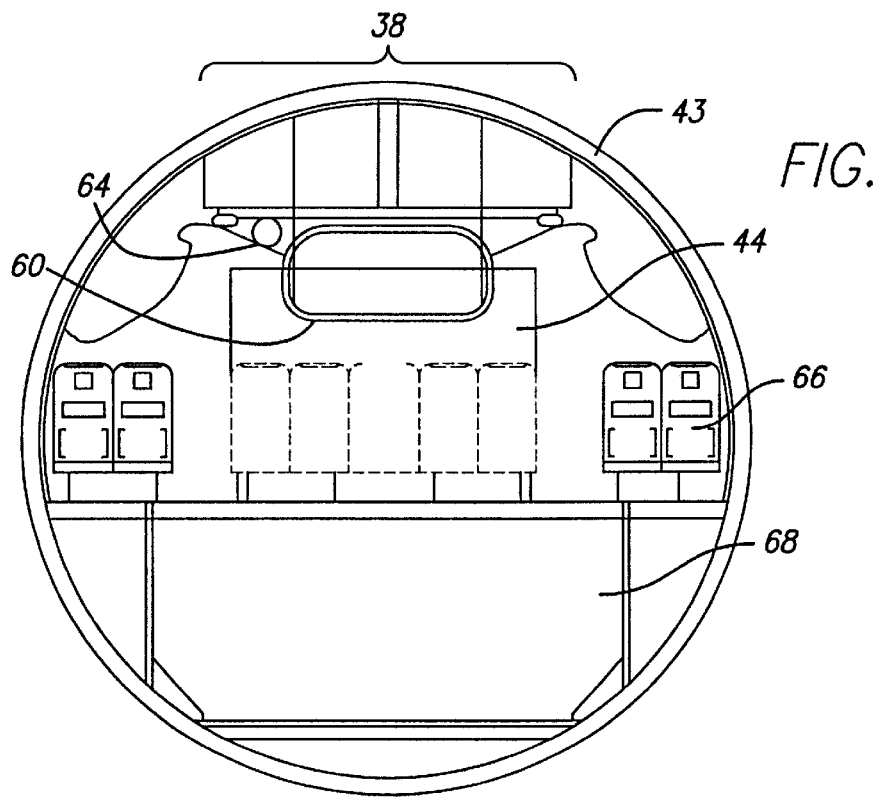
FIG. 6 is a cross-sectional view of the mid-section of the aircraft looking forward through the overhead crew rest portion.

As is illustrated in the drawings, the invention is embodied in an improved crew rest station for an aircraft used for long distance flights, such as the Boeing 777. Referring to FIGS. 1–3 and 8, in a presently preferred embodiment, an aircraft 30, such as the Boeing 777 for example, is advantageously provided with a crew rest station 32 located approximately in the aircraft midsection 34, adjacent door number three 36. The crew rest station includes an overhead crew rest portion 38 with forward and aft bunk portions 40 and side bunk portions 42 configured in cross-wise fashion and contoured to occupy a particular location, as for example, against the curved top portion of the hull 43 of the aircraft to fit in the space between the hull and the lowered ceiling of the aircraft, as illustrated in FIG. 6 and further explained below. Access to the crew rest is also preferably provided through an entry vestibule 44 adjacent to forward restrooms 46, and can advantageously replace a lavatory in the center cabin area just aft of the cross aisle at door number three. In a presently preferred embodiment, the crew rest provides eight bunks that thus can sleep up to eight people in an area of the aircraft that would otherwise be unused. This results in very low intrusion into normally otherwise occupied space such as the cargo bay and the main deck seating area. The crew rest station preferably includes sufficient space to provide all the amenities and emergency equipment that would be necessary to satisfy the flight regulations.

Figure 1:
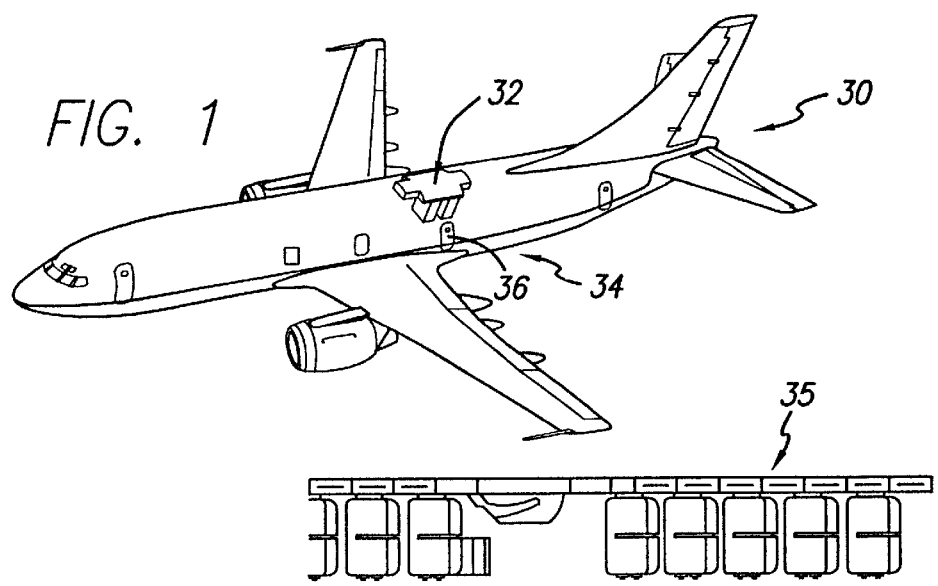
FIG. 1 is a perspective view of aircraft showing crew rest station in phantom.
Figure 2:
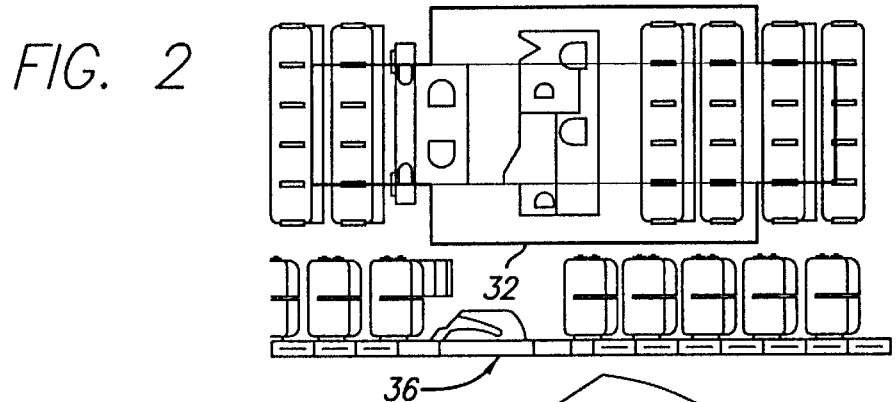
FIG. 2 is a top plan schematic diagram of placement of crew rest station aboard the aircraft.
Figure 3:
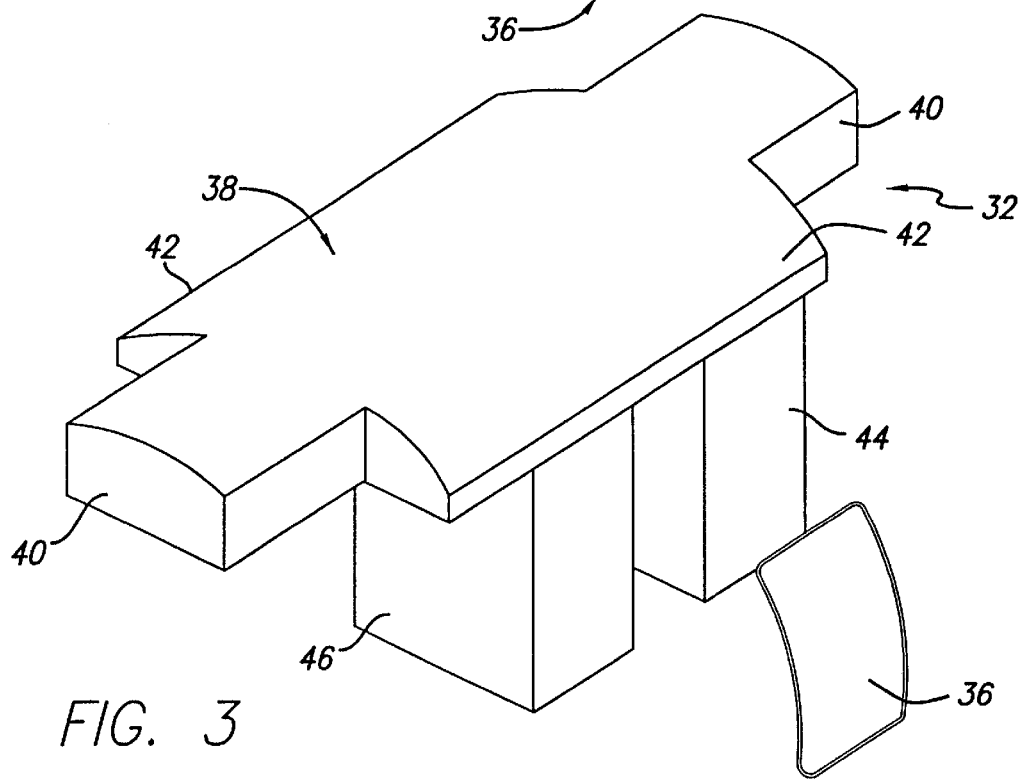
FIG. 3 is a perspective schematic view of overhead crew rest portion, forward rest rooms, and vestibule.
Figure 4:
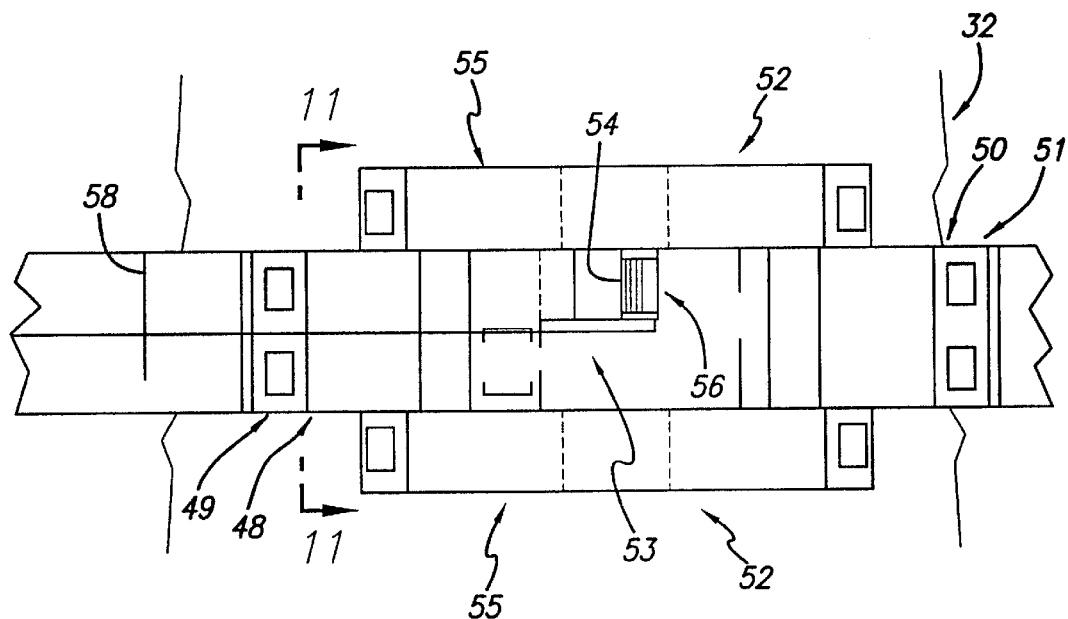
FIG. 4 is a top plan view of the overhead crew rest portion.

Referring to FIG. 4, in a presently preferred embodiment, the overhead crew rest portion includes two forward bunks 48, two aft bunks 50, and four side bunks 52. The overhead crew rest portion is preferably formed of a lightweight composite material, such as fiberglass, for example, and can be molded as a single unit for increased strength, so that the unit does not need to be bolted together. Alternatively, the overhead crew rest portion can be formed of modular sections, with aft 51 and forward 49 bunk modules that can be connected together with a central deck module 53, as well as a desired number of side bunk modules 55, all preferably formed of molded composite material, such as fiberglass. It should be recognized that a crew rest station of a larger or smaller capacity could also be provided by simply increasing or reducing the number of side bunks, and that a flight crew rest station could be provided at other locations in the aircraft as well, such as a forward flight crew rest station with two bunks, for example. The overhead crew rest portion preferably is accessed by an entry ladder 54 extending up through an entry way 56. It should be pointed out that the typical hoop frame 58 of the aircraft supports and allows for sufficient space for the overhead crew rest portion in otherwise unused space of the aircraft.

Figure 5:
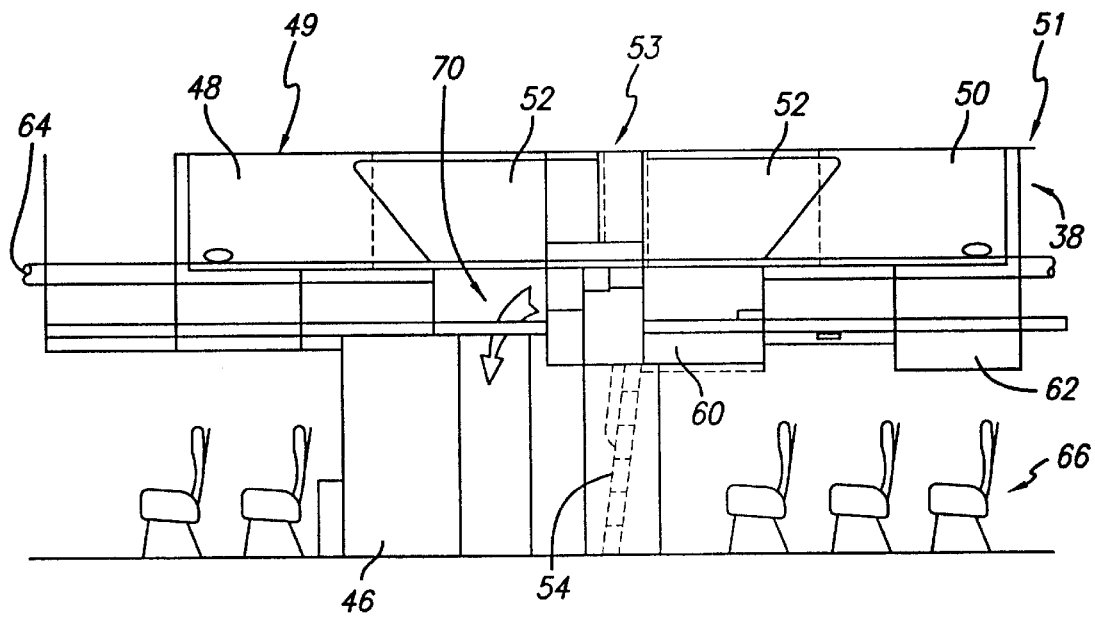
FIG. 5 side elevational sectional view of the overhead crew rest portion.
Figure 7:
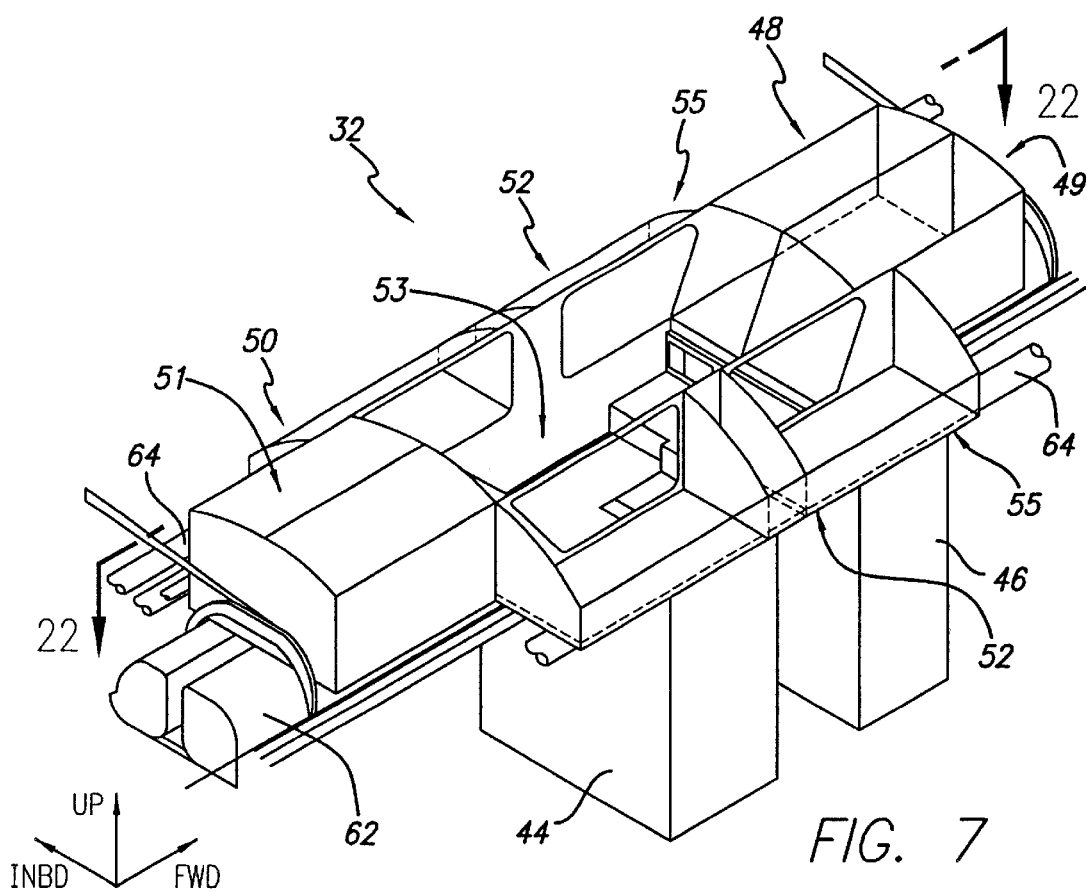
FIG. 7 is a cutaway perspective view of the overhead crew rest portion.

As is more clearly seen in FIGS. 5, 6 and 7, the aircraft typically includes a lowered ceiling 60, with space provided above the ceiling for the overhead stowage bins 62, and various types of ducting 64 above the seating 66. The overhead crew rest portion located between the hull and lowered ceiling of the aircraft thus does not impinge upon the seating area or the cargo area 68 of the aircraft.

Figure 8:
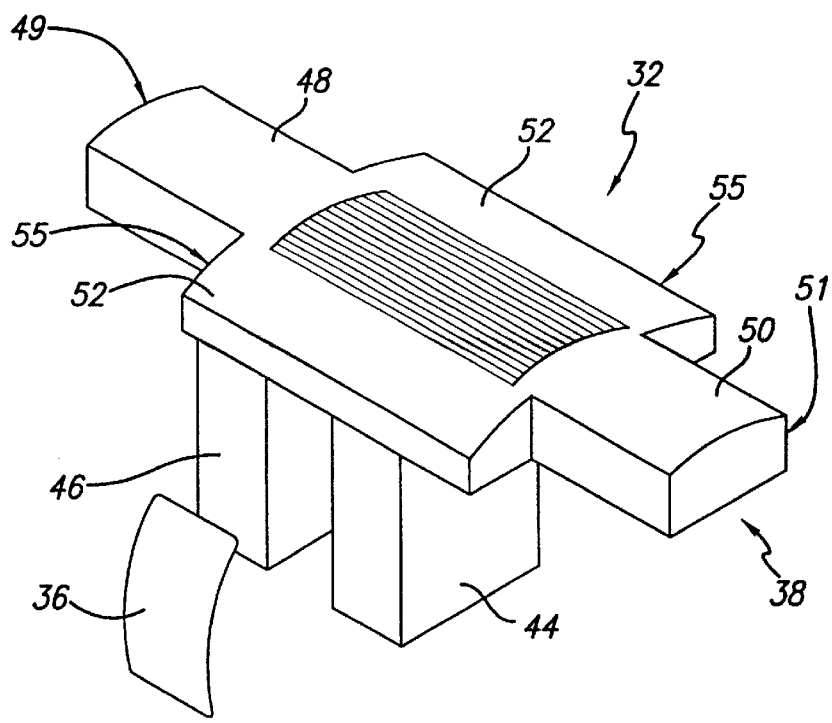
FIG. 8 is another perspective view of the overhead crew rest portion.
Figure 9:
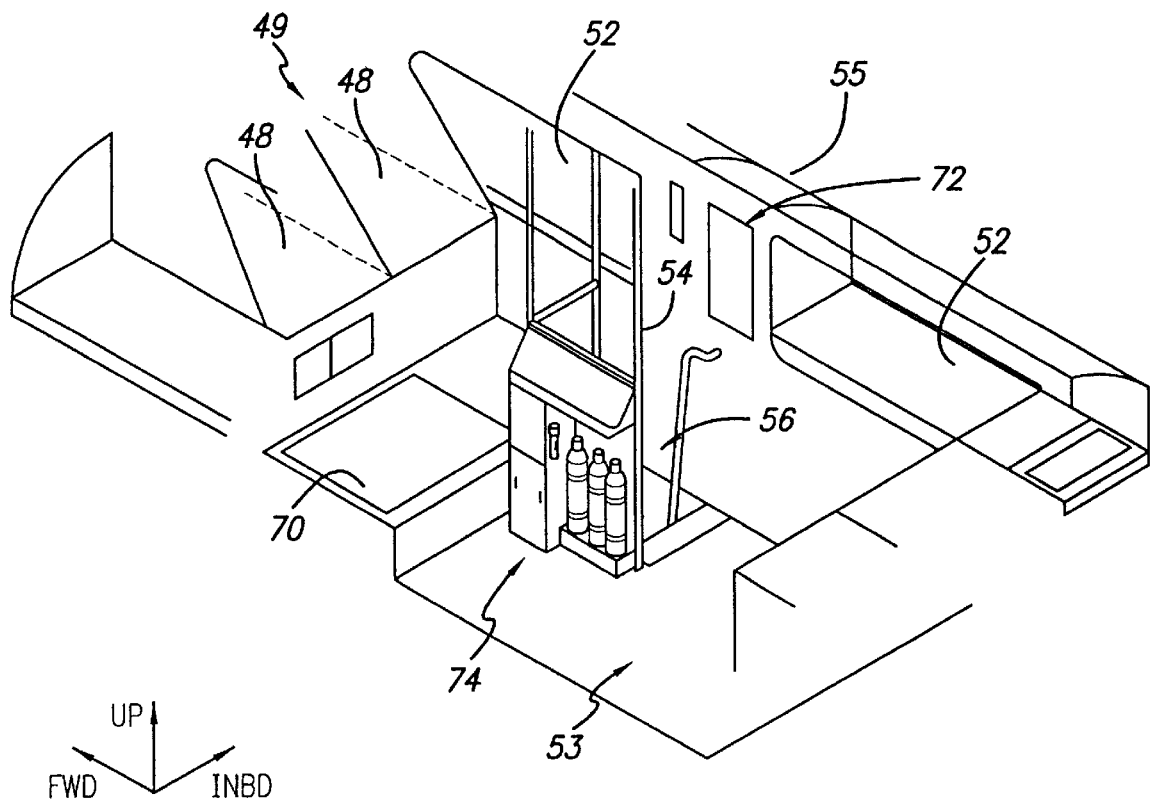
FIG. 9 is a perspective view of the interior of the overhead crew rest portion shown in FIG. 8.

Referring to FIGS. 9, showing a perspective view of the interior of the overhead crew rest portion shown in FIG. 8, and FIG. 12, the overhead crew rest portion also preferably includes an emergency escape hatch 70. As can be seen in FIG. 9, a main crew rest control panel 72 is also preferably provided, as will be explained further below, as well as a cabinet 74 such as for emergency equipment, waste receptacles, and the like.

The vestibule also economically provides space for a lavatory/vanity area 75, also explained further below, adjacent to the crew rest entry way, a closet space 76, and a folding door 78 to provide a modicum of privacy to the overhead crew rest area, as is illustrated in FIGS. 10 and 11.

Figure 14:
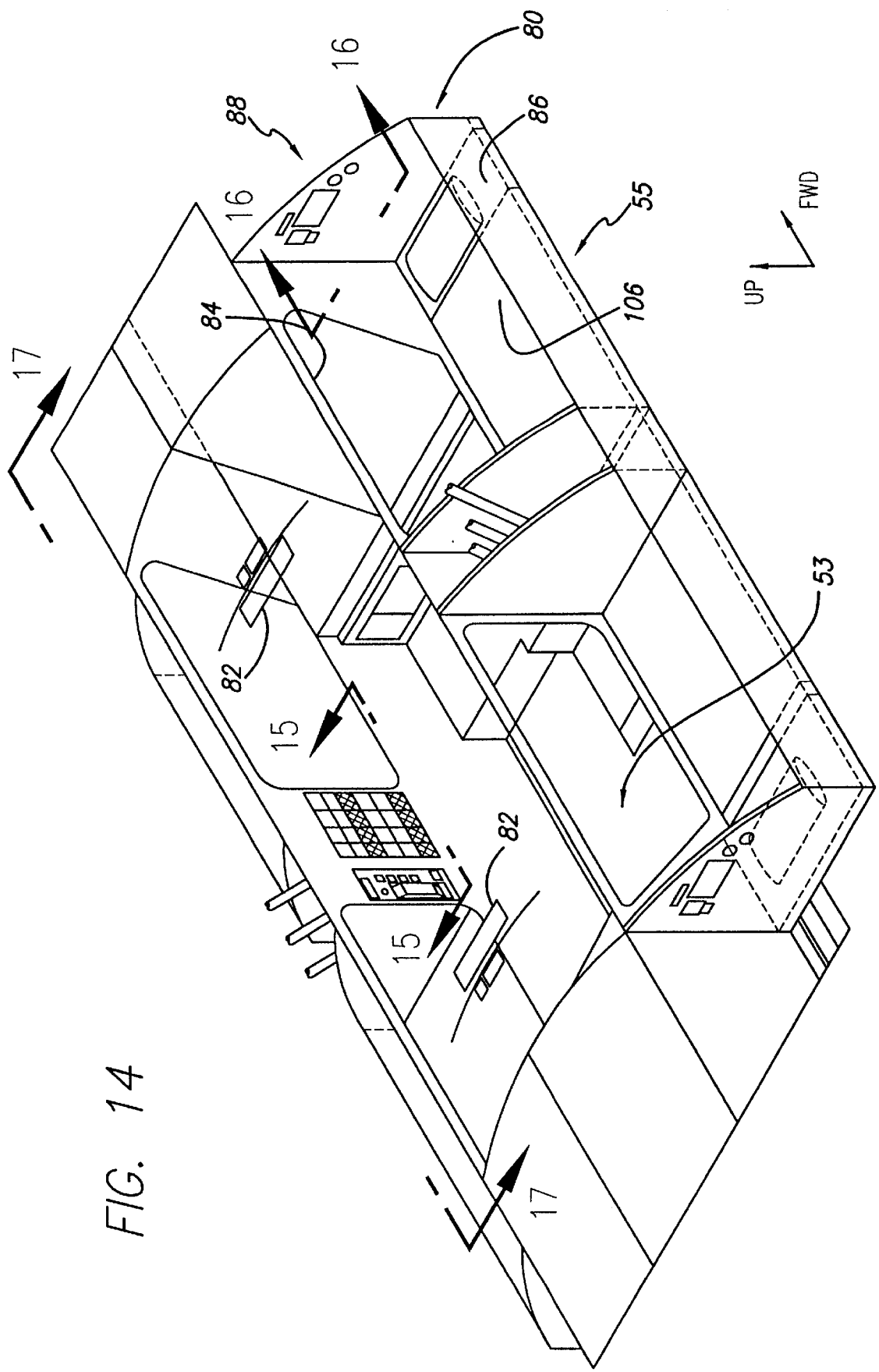
FIG. 14 is a perspective cutaway view of the right side forward bunks.
Figure 15:
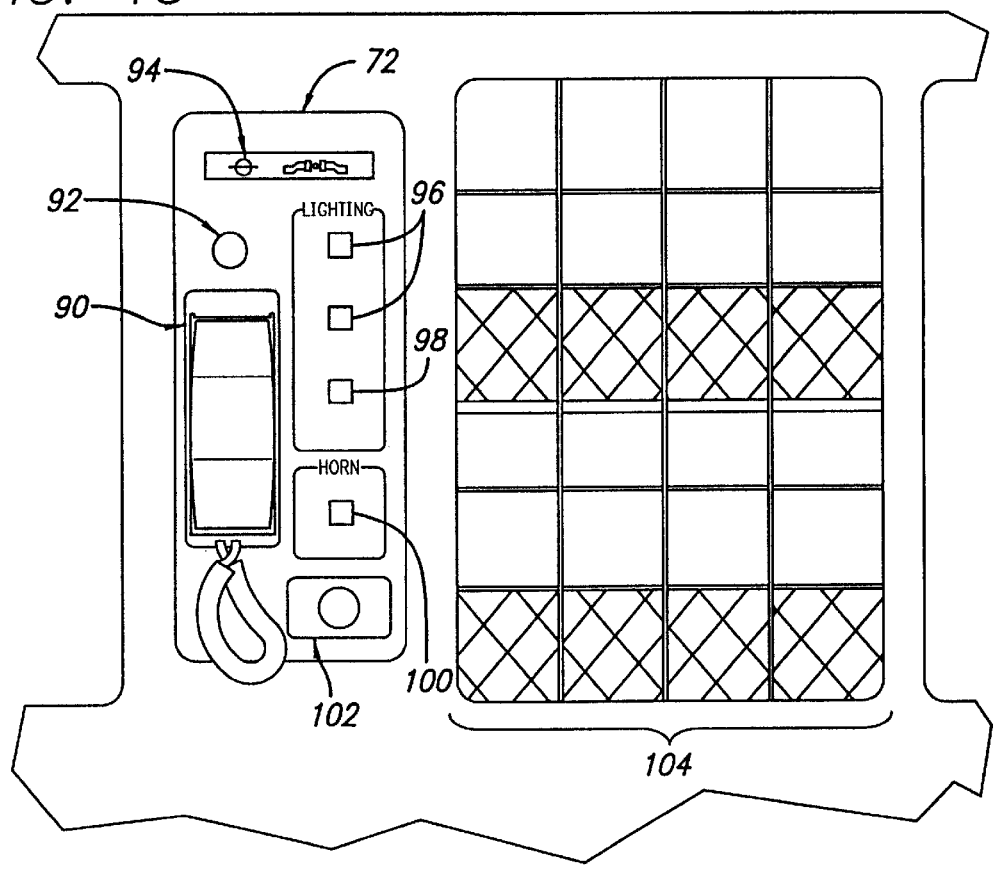
FIG. 15 is a sectional view of the main crew control panel taken along line 15—15 of FIG. 14.

Now turning to FIGS. 13 to 21, the overhead crew rest portion will be explained in greater detail. FIG. 13 highlights the general layout of a right side forward bunk 80 also illustrated in more detail in FIGS. 14 and 16. Referring to FIG. 14, the overhead crew rest portion includes overhead lighting 82, and each individual bunk includes an entry 84 that can be curtained to provide individual privacy and darkness for each individual bunk even when the overhead lighting is on. Toward the head of the bunk 86 are individual comfort controls 88, allowing for control of lighting and airflow within the bunk area. FIG. 15 illustrates one presently preferred embodiment of the main crew control panel, which can include an intercom phone 90, a call warning light 92, no smoking and seat belt indicators 94, overhead crew rest portion light switches 96, vestibule light switches 98, horn switch 100, and a service outlet 102. A stowage area 104 is also preferably provided, such as for stowing shoes or other personal items.

Figure 16:
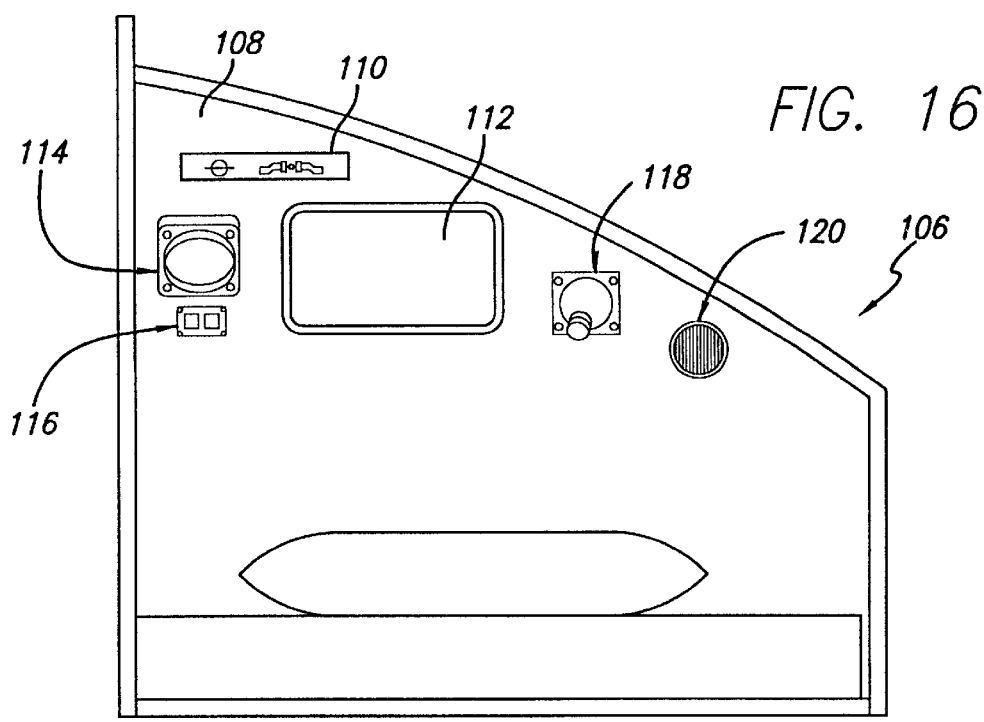
FIG. 16 is a sectional view of a bunk area taken along line 16—16 of FIG. 14.

As is illustrated in FIG. 16, an individual bunk area 106 can have mounted on a vertical side wall 108 such control, emergency and indicator items as a no smoking and seat belt indicator 110, oxygen mask 112, reading light 114, reading light switches 116, air flow nozzle 118, also commonly known in the industry as a gasper, as well as an air intake register 120 for recirculation of cabin air.

Figure 17:
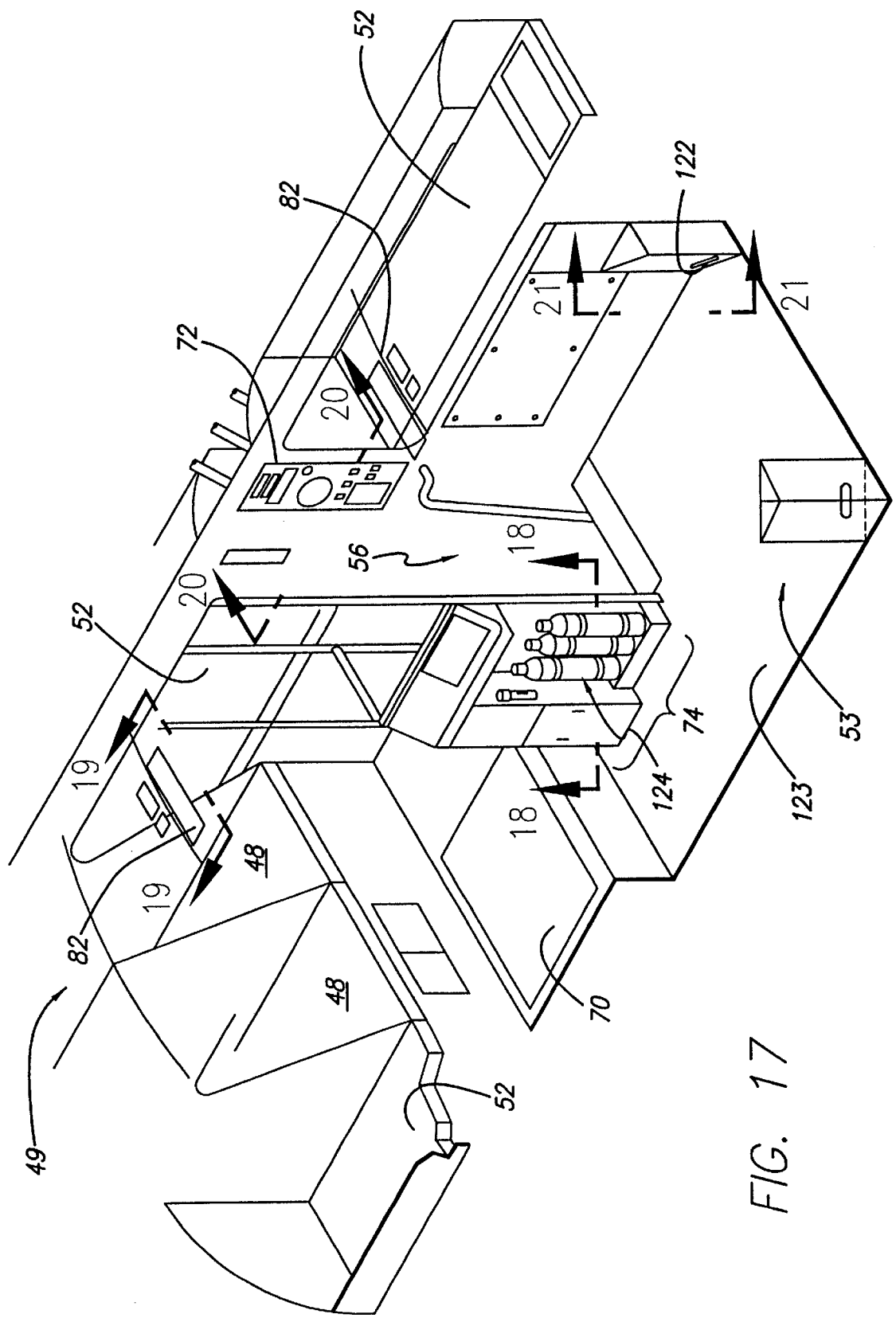
FIG. 17 is a sectional view of the interior of the overhead crew rest portion taken along line 17—17 of FIG. 14.
Figure 20:
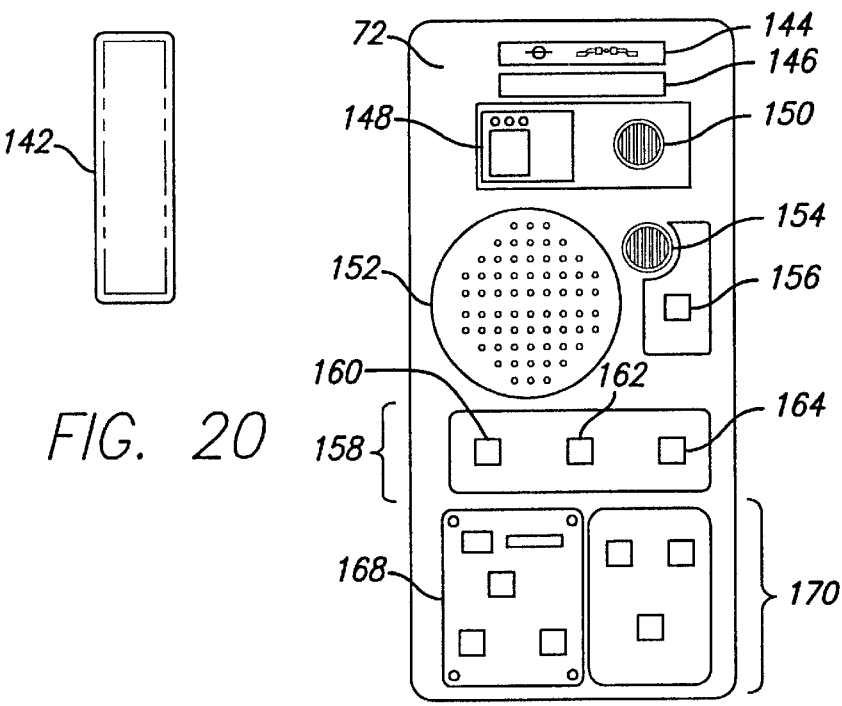
FIG. 20 is an enlarged sectional view of an alternate embodiment of the main crew rest control panel taken along line 20—20 of FIG. 17.

With reference to FIG. 17, showing the interior of the overhead crew rest portion, an aisle light 122 is also preferably provided near the crew rest portion deck 123, in a corner bunk non-skid access step 172 preferably having a non-skid surface 173, as is further illustrated in FIG. 21, and the central cabinet may be provided with various types of emergency equipment, such as fire extinguishers 124, further illustrated in FIG. 18. The cabinet may provide for emergency equipment, waste receptacles, and the like, and in one presently preferred embodiment, includes an access panel 126, a night light 128, and an emergency light 130. Other items such as a flashlight 132, and emergency oxygen 134 can also be provided.

As shown in FIG. 19, the crew rest portion also preferably provides an overhead panel 135 with an emergency light 136, a smoke detector 138, and a fluorescent light panel 140. In another presently preferred embodiment, the main crew rest control panel, located near the exit sign 142, includes a no smoking, fasten seat belt indicator 144, a smoke warning/decompression warning indicator 146, a smoke detector 148, a low airflow warning chime 150, speaker 152 such as for onboard announcements, and a smoke detection warning horn 154 as well as a horn shutoff switch 156. Test switches 158 can also be provided, such as a test switch for the emergency light switch 160, a test switch for smoke warning indicator 162, and a test switch for decompression warning 164, for example. The control panel may also include smoke detector control panel 168, and centralized sleeping area light controls 170 for the overhead crew rest area.

Figure 23:
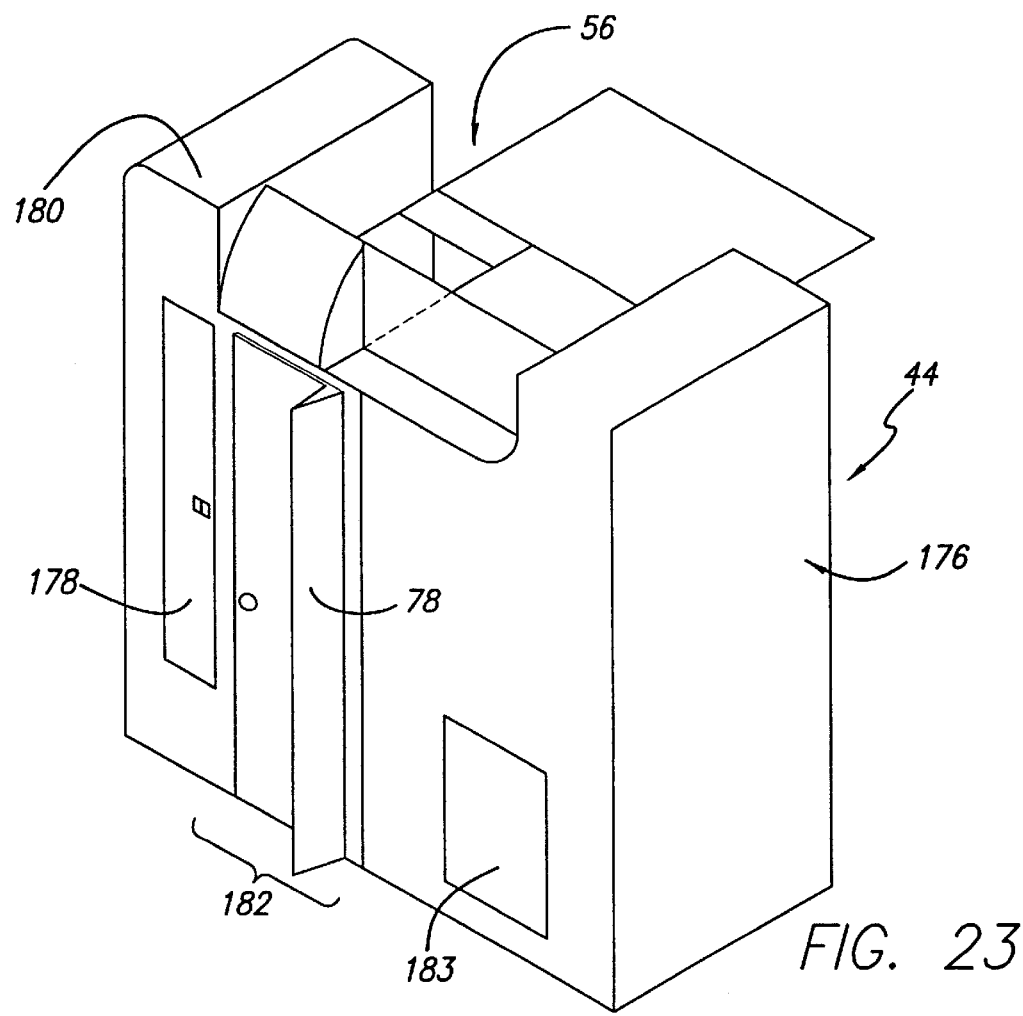
FIG. 23 is a perspective view of the vestibule showing the folding doors and entry way.
Figure 24:
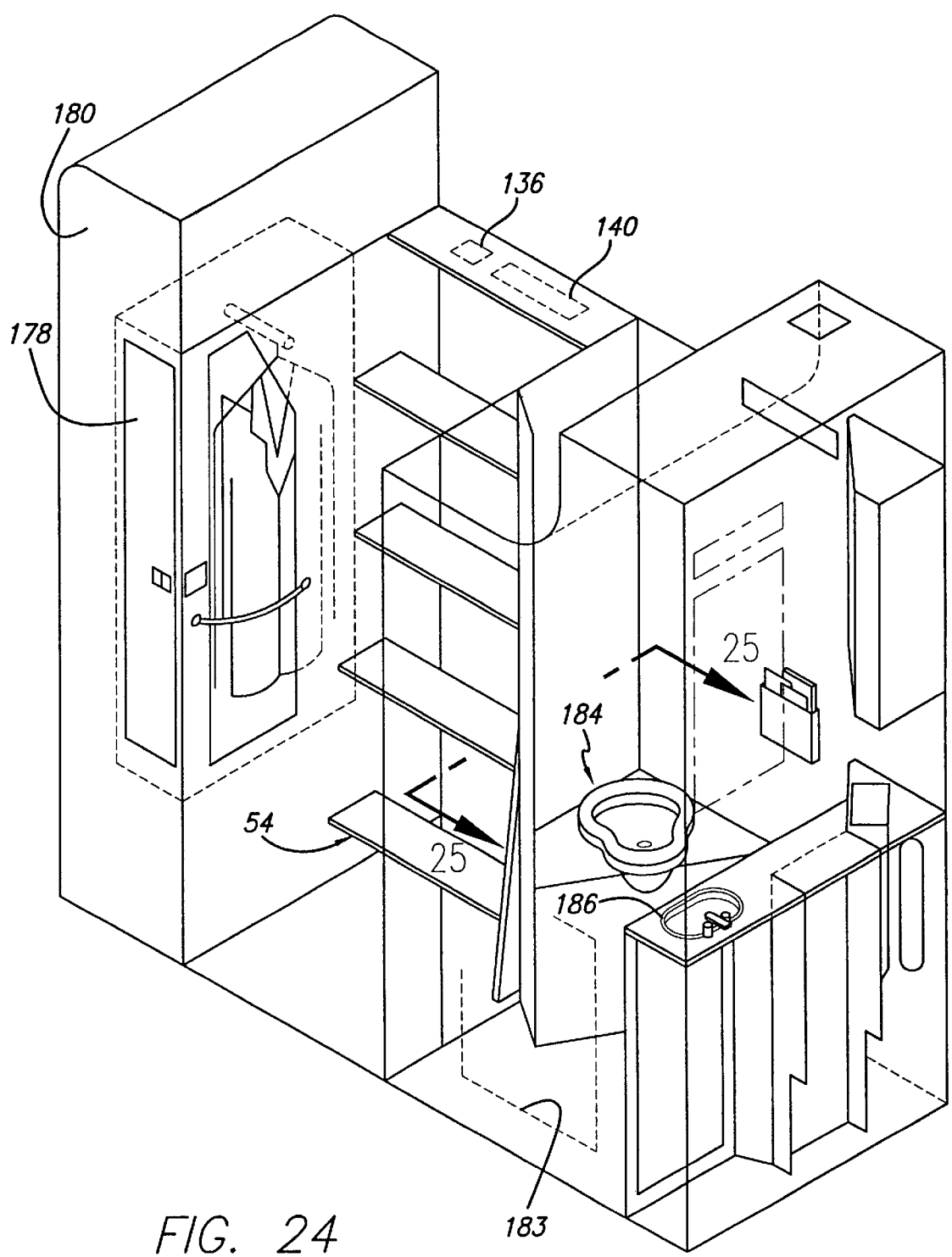
FIG. 24 is a sectional view of the coat closet looking aft and inboard taken along line 24—24 of FIG. 22.
Figure 25:
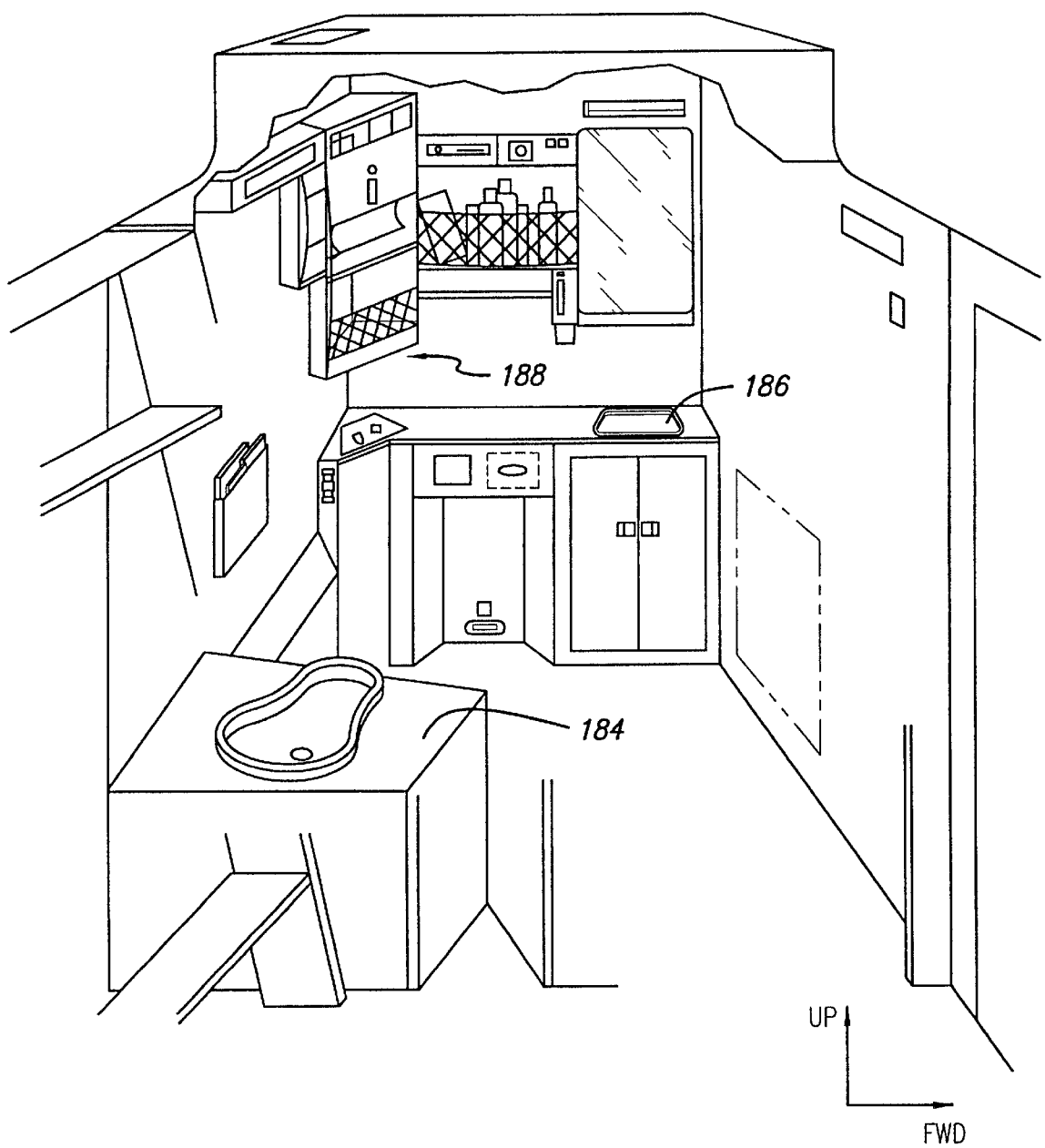
FIG. 25 is a sectional view of the lavatory taken along line 25–25 of FIG. 24.

The vestibule is further illustrated in FIG. 22, 23 and 24, showing the forward crew lavatory 176, coat closet 178, additional closet space 180, such as for a video control, and the crew rest entry 182. As is shown in FIGS. 23 and 24, the lavatory 176 may also include an emergency kick-out panel 183, and referring to FIGS. 24 and 25, showing the closet and lavatory space in greater detail, the lavatory typically includes a toilet 184, a sink 186, stowage 188, and other common amenities.

It will be apparent from the foregoing that while particular forms of the invention have been illustrated and described, various modifications can be made without departing from the spirit and scope of the invention. Accordingly, it is not intended that the invention be limited, except as by the appended claims.

What is claimed is:

1. In an aircraft crew rest station for a long distance airline flight, the aircraft having a hull with a curved top portion, a lowered ceiling, a space therebetween, and an overhead crew rest portion contoured to occupy the space between the curved top portion of the hull of the aircraft and the lowered ceiling of the aircraft, said space overlying a passenger seating area within the hull of the aircraft, said space further separated from said passenger seating area by said ceiling over said passenger seating area, the improvement comprising:

a central deck module disposed in said overhead crew rest portion; and a central entry vestibule connected to said passenger seating area and providing direct access to said central deck module of said overhead crew rest portion.

2. The aircraft crew rest station of claim 1, further comprising a first bunk portion connected to a forward portion of said central deck module and disposed in said overhead crew rest portion.

3. The aircraft crew rest station of claim 1, further comprising a second bunk portion connected to an aft portion of said central deck module and disposed in said overhead crew rest portion.

4. The aircraft crew rest station of claim 1, further comprising a side bunk portion connected to said central deck module and disposed in said overhead crew rest portion.

5. The aircraft crew rest station of claim 1, further comprising a first bunk portion connected to a forward portion of said central deck module and disposed in said overhead crew rest portion; and a second bunk portion connected to an aft portion of said central deck module and disposed in said overhead crew rest portion.

6. The aircraft crew rest station of claim 5, wherein said overhead crew rest portion further comprises side bunk portions connected to said central deck module and disposed in said overhead crew rest portion, and said forward, aft, and side bunk portions are configured in cross-wise fashion.

7. The aircraft crew rest station of claim 1, wherein said central vestibule further comprises a lavatory area.

8. The aircraft crew rest station of claim 1, wherein said central vestibule further comprises a closet.

9. The aircraft crew rest station of claim 1, wherein said central deck module further comprises an emergency escape hatch.

10. The aircraft crew rest station of claim 5 wherein each of said forward and aft bunk portions extends from said central deck module in a direction approximately parallel to the hull center line.

11. The aircraft crew rest station of claim 6 wherein each of said forward, aft and side bunk portions extends from said central deck module.

12. The aircraft crew rest station of claim 1, wherein said central deck module further comprises at least one seat that may be occupied by a crew member.

* * * * *